United States Patent [19]
Burg

[11] Patent Number: 5,176,095
[45] Date of Patent: Jan. 5, 1993

[54] MULTIPLE HULL AIR RIDE BOAT

[76] Inventor: Donald E. Burg, 15840 SW. 84th Ave., Miami, Fla. 33157

[21] Appl. No.: 728,887

[22] Filed: Jul. 10, 1991

Related U.S. Application Data

[63] Continuation-in-part of Ser. No. 653,724, Feb. 11, 1991, Ser. No. 458,575, Dec. 29, 1989, Pat. No. 5,000,107, Ser. No. 183,588, Apr. 19, 1988, Pat. No. 4,890,564, Ser. No. 862,300, May 12, 1986, Pat. No. 4,739,719, Ser. No. 844,529, Mar. 27, 1986, Pat. No. 4,735,164, Ser. No. 584,728, Feb. 29, 1984, Pat. No. 4,587,918, Ser. No. 465,670, Feb. 10, 1983, abandoned, Ser. No. 458,738, Jan. 17, 1983, abandoned, Ser. No. 343,287, Jan. 27, 1982, abandoned, Ser. No. 289,769, Aug. 3, 1981, abandoned, Ser. No. 269,908, Jun. 3, 1981, Pat. No. 4,392,445, Ser. No. 207,789, Nov. 17, 1980, abandoned, Ser. No. 69,771, Aug. 27, 1979, abandoned, Ser. No. 818,303, Jul. 25, 1977, Pat. No. 4,165,703, and Ser. No. 737,403, Nov. 1, 1976, abandoned.

[51] Int. Cl.$^5$ .................................................. B63B 1/38
[52] U.S. Cl. .................... 114/67 A; 114/289; 114/290; 180/126
[58] Field of Search .................... 114/67 R, 67 A, 289, 114/290, 285, 286, 287, 292; 180/126

[56] References Cited

U.S. PATENT DOCUMENTS

| | | | |
|---|---|---|---|
| 1,307,135 | 6/1919 | Lake | 114/67 A |
| 3,191,572 | 6/1965 | Wilson | 114/67 A X |
| 3,606,857 | 9/1971 | Sundquist | 114/67 A X |
| 4,031,841 | 6/1977 | Bredt | 114/67 A |
| 4,393,802 | 7/1983 | Rizzo | 114/67 A |

Primary Examiner—Sherman Basinger
Attorney, Agent, or Firm—Robert J. Van Der Wall

[57] ABSTRACT

An improved performance marine surface vessel that includes pressurized supporting gas cushions in multiple hulls, normally catamaran-like sidehulls, where such pressurized supporting gas cushions support a majority of boat weight in operation. The preferred embodiment of the invention utilizes long fine pointed bow catamaran-like sidehulls that are in mechanical communication with a connecting hull structure. The long fine sidehulls offer performance advantages over a single large supporting gas cushion. The invention may also include a center bow disposed between the sidehulls that adds to stability in rough seas and gives a racy yacht-like appearance. Recesses in the sidehulls may include, at least in part, fixed and/or movable seals. Fixed seals may include inset vented steps to reduce wetted surface area. The recess gas pressurization system may include a controller to control pressures in individual recesses which allows at least some control of boat motions in rough seas. A further feature is the use of vertically oriented vented steps in the sides of the sidehulls to reduce wetted area drag when operating in rough seas. One other feature is the use of air flow turbulence generators on the underside, or wetdeck, of the connecting hull structure to thereby increase static pressure lifting forces acting on the connecting hull structure.

101 Claims, 3 Drawing Sheets

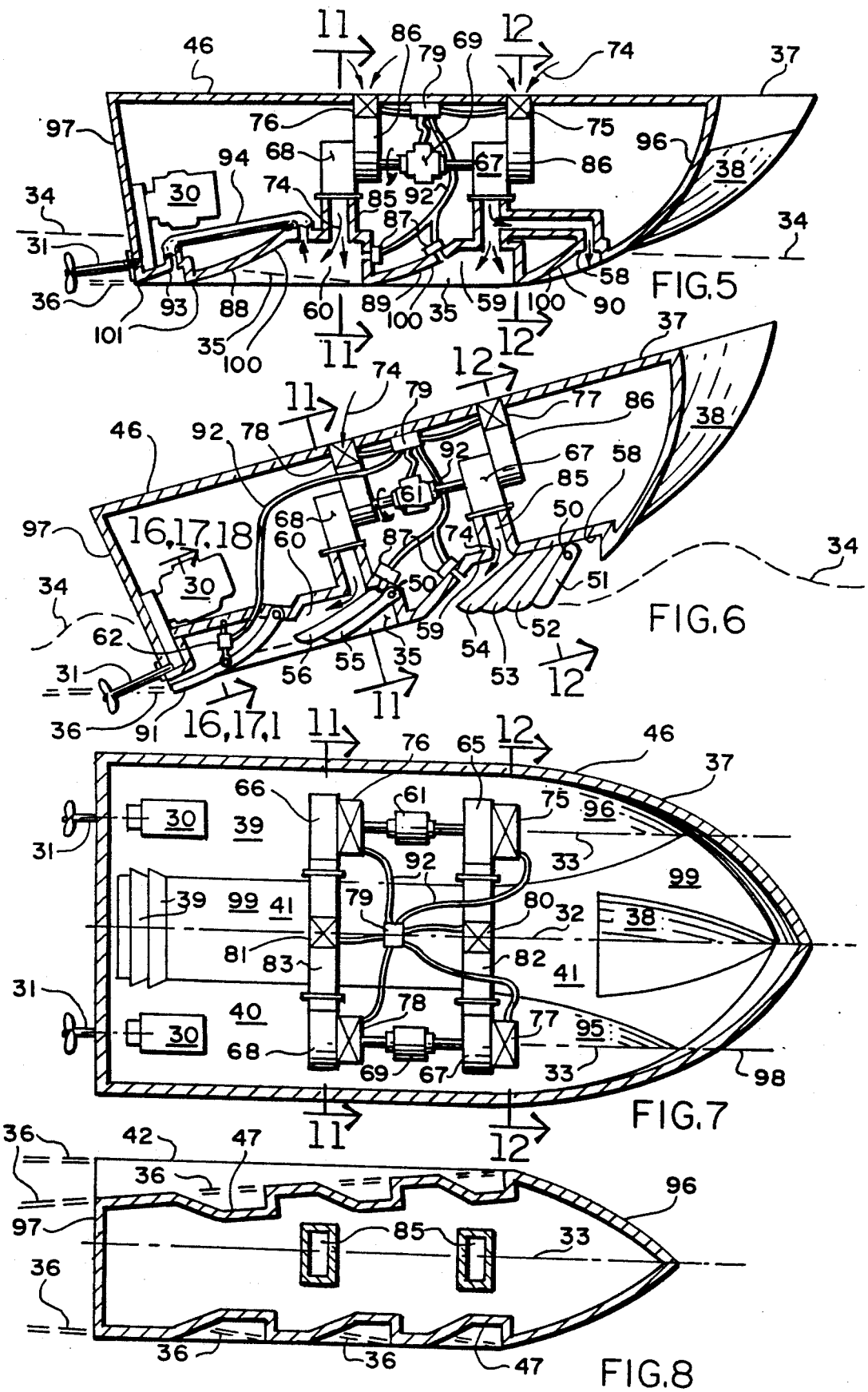

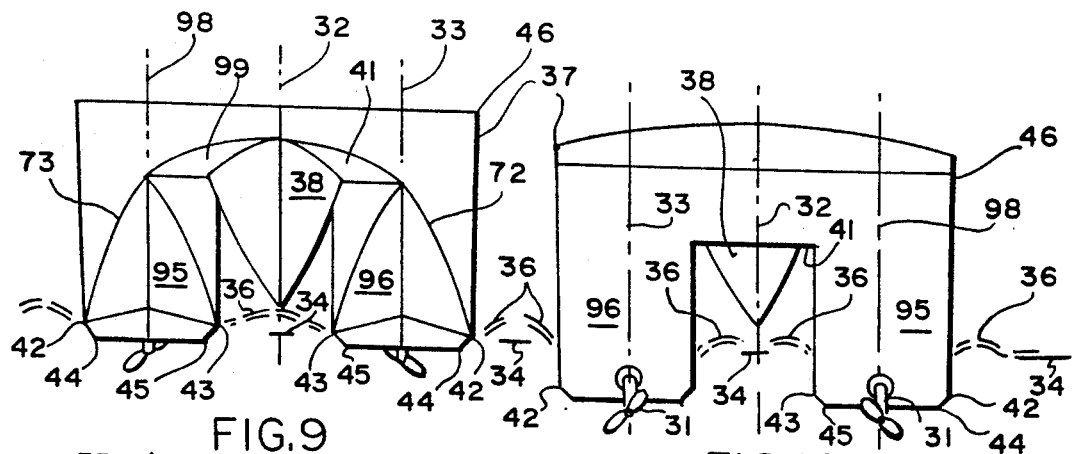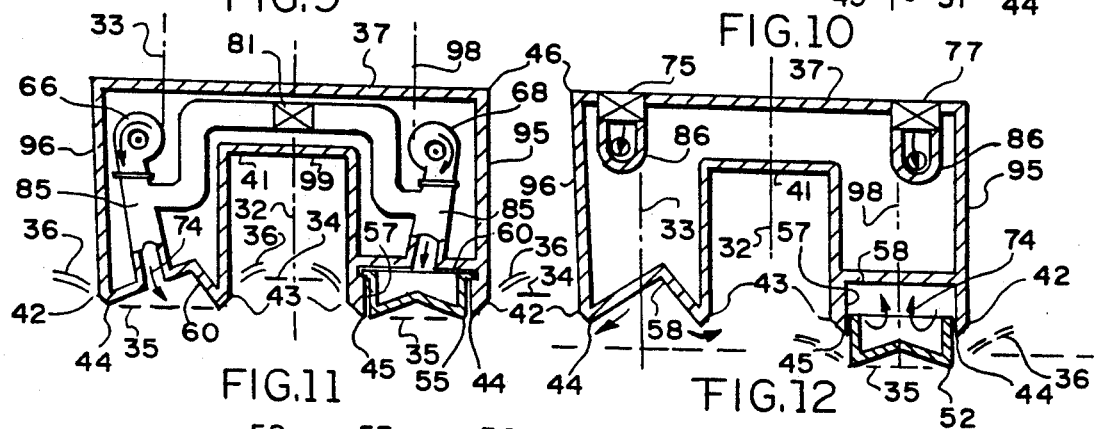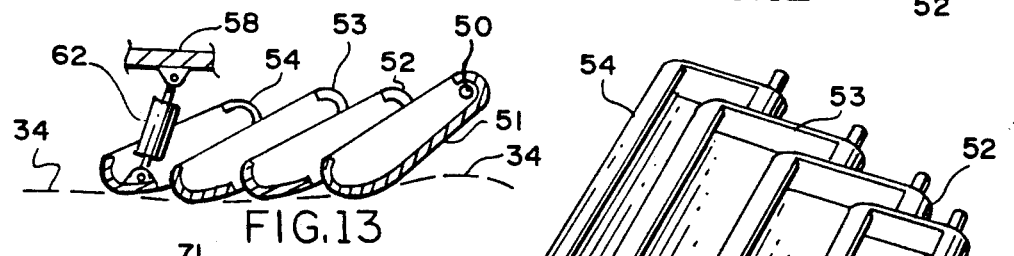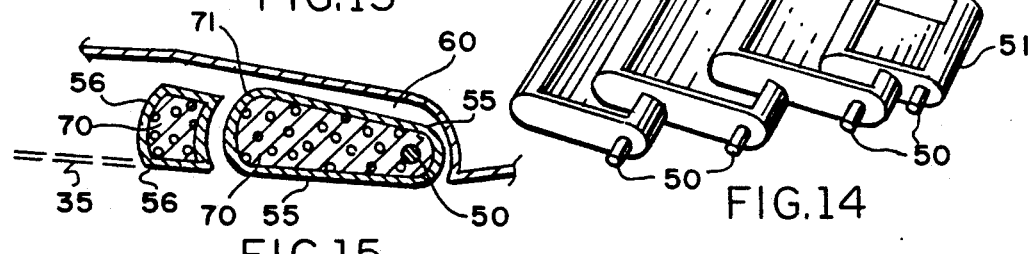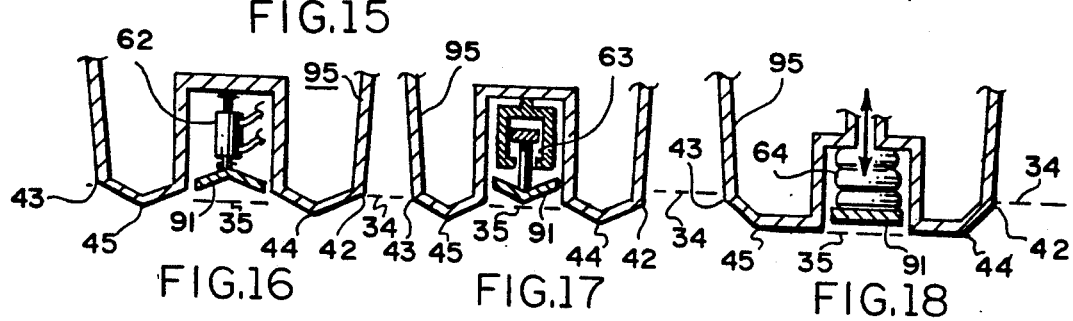

MULTIPLE HULL AIR RIDE BOAT

CROSS REFERENCE TO OTHER APPLICATIONS

This application is a continuation-in-part to applicant's earlier applications, Ser. No. 737,403 filed Nov. 1, 1976, now abandoned; Ser. No. 818,303 filed Jul. 25, 1977, now U.S. Pat. No. 4,165,703 issued Aug. 28, 1979; Ser. No. 069,771 filed Aug. 27, 1979, now abandoned; Ser. No. 207,789 filed Nov. 17, 1980, now abandoned; Ser. No. 269,908 filed Jun. 3, 1981, now U.S. Pat. No. 4,392,445 issued Jul. 12, 1983; Ser. No. 289,769 filed Aug. 3, 1981, now abandoned; Ser. No. 343,287 filed Jan. 27, 1982, now abandoned; Ser. No. 458,738 filed Jan. 17, 1983, now abandoned; Ser. No. 465,670 filed Feb. 10, 1983, now abandoned; International Application No. PCT/US 83/001 067 filed Jul. 11, 1983 now WO 85/00332; Ser. No. 584,728 filed Feb. 29, 1984, now U.S. Pat. No. 4,587,918 issued May 13, 1986; Ser. No. 844,529 filed Mar. 27, 1986, now U.S. Pat. No. 4,735,164 issued Apr. 5, 1988; Ser. No. 862,300 filed May 12, 1986, now U.S. Pat. No. 4,739,719 issued Apr. 26, 1988; Ser. No. 183,588 filed Apr. 19, 1988, now U.S. Pat. No. 4,890,564 issued Jan. 2, 1990; International Application No. PCT/US 89/001421 filed Apr. 6, 1989 now WO 89/10294; Ser. No. 458,575 filed Dec. 29, 1989, now U.S. Pat. No. 5,000,107 issued Mar. 19, 1991; International Application No. PCT/US 91/001002 filed Feb. 11, 1991; and Ser. No. 653,724 filed Feb. 11, 1991.

FIELD OF THE INVENTION

This invention relates to the field of marine vessels made more efficient in operation by the use of a supporting pressurized gas cushion disposed in a recess in the underside of the vessel's hull. The principle emphasis of the instant invention relates to the use of multiple hulls, primarily of catamaran-like configuration, where such hulls individually incorporate gas pressurized recesses in their undersides to thereby effect a multiple and widely spaced set of pressurized gas cushions. A wave clearing cross deck, referred to as the "wetdeck", is formed between pressurized gas cushion catamaran-like sidehulls. This is done using more or less pointed bow boat shaped sidehulls in the optional configuration. Other items that may be incorporated to improve performance of the instant invention include one or more center hulls (called center bows in this document due to their preferred truncated bow-like shapes), vertically oriented steps in the sidehulls to reduce wetted area drag in rough seas, sidehull recess seal members that can be either fixed or movable, and means to regulate gas pressure in at least partially separated recess gas cushions and thereby control pitch, roll, and heave motions of the vessel.

BACKGROUND OF THE INVENTION

This invention is a further improvement to applicant's earlier inventions in this field that are generally entitled "Air Ride Boat Hulls". All of these inventions require the introduction of pressurized gas into a recess in the underside of a boat hull to increase operating speeds and load carrying capabilities and improve stability. The improvements are the result of the pressurized gas cushion supporting some eighty to ninety percent of boat weight in most cases. The efficiency improvements at high speed are mainly the result of a reduction, normally by several orders of magnitude, of wetted area drag compared to a more conventional hull form.

The instant invention offers significant advances over applicant's earlier patents from the standpoint of use of multiple, primarily parallel and widely spaced, hulls. The effect of this is to change and improve vessel stability and resistance and performance characteristics, in many instances, compared to a more generic air cushion supported marine craft such as the Surface Effect Ship (SES). The SES has thin parallel sidehulls that are joined transversely fore and aft by full span flexible seals—the space thus formed is pressurized with air to provide a large lifting force. As such, it can be seen that the generic air cushion supported marine craft has a single rather wide rectangular footprint on the water's surface compared to the two or more widely spaced narrower and finer, preferably pointed bow shaped, footprints of the instant invention.

The widely spaced long and thin air cushion hulls, in combination, have a much reduced low or "hump" speed resistance characteristic than does a single wide air cushion hull. However, at very high speeds a large wide air cushion hull with its single cushion generally has less resistance. That is due in part to the added wetted area resistance of the necessary extra sidewalls on the inboard sides of the separated catamaran-like sidehulls of the instant invention. Some effort has been made in the instant invention to reduce that wetted area effect by use of new concept vertically oriented steps that are preferably vented by surface air supplied downward along the vertical steps. It is preferable to have the sidewalls taper inward going aft in way of the vertical steps to reduce the drag force due to the impingement of water spray on the steps.

The instant invention accomplishes the preceding, in its optimum configuration, while using essentially boat shaped sidehulls that, in their preferred embodiment, have a generally pointed bow and truncated stern shape as seen in a dynamic waterline plane where the water contacts the sidehull. At least one of the sidehull keels diverges outward aft of the bow and then become substantially parallel over most of its after length. The sidehulls are symmetrical in the preferred embodiment; however, asymmetrical sidehulls can be used. Use of fixed and/or movable seals can also be used in or proximal to the sidehull pressurized gas recesses.

The U.S. Navy funded some studies in the early eighties of a boat that utilized catamaran-like sidehulls with each sidehull a generic SES. As stated before, the generic SES is a pressurized air cushion vehicle that incorporates full span flexible seals fore and aft (bow and stern) between parallel sidehulls. In the Navy's concept, the twin generic SES sidehulls were separated by and connected to a cross deck or wetdeck structure. Not only were their sidehulls parallel, but each sidehull had sides that were thin and plate-like and ran completely up to the wetdeck. Outward extensions of the wetdeck actually formed the upper surface of the pressurized gas recesses. This can be seen from FIG. 2, page 302, from an article titled: "The Surface Effect Catamaran—Progress in Concept Assessment" by F. W. Wilson, et al, pages 301-311, *Naval Engineer's Journal*, May 1983, published by the American Society of Naval Engineers, Inc., 1452 Duke Street, Alexandria, Va. 22314. That article gives a detailed summary of the Navy's catamaran sidehull air cushion vehicle project. Comparison of the vehicle described in that article and the instant invention clearly shows the significant conceptual improvements and, in most cases, simplifications that the instant invention offers over the Navy's concept. For purposes of simplification, the Navy's project will be referred to as SECAT (their acronym made from Surface Effect CATamaran) in the remainder of this document.

SECAT's idea was that each sidehull's flexible bow seals would give to waves and they could pass through the sidehull recess without molestation unless they were of sufficient height to contact the recess wetdeck. While the SECAT's analytical and model studies were encouraging there appears to have been no follow-on efforts on actual full size or prototype vessels. SECAT also requires extra structural weight for the long thin cantilevered sidehull plates and would have very poor off-cushion performance. It would appear that concern for the aforementioned plus the very high, narrow, and high maintenance flexible seals in each sidehull recess with the related tremendous increase in wetted area resistance in high seas, due to the extra vertical movement of the flexible seals on the inboard sides of each sidehull and resulting increases in wetted area, compared to a generic single chamber SES, probably discouraged further efforts.

The instant invention's sidehulls, in their preferred embodiment, have substantially pointed bows that allow the use of shallow recesses since the pointed bows divide an oncoming wave and direct it to either side of a sidehull rather than allowing its full passage into a sidehull's recess. The instant invention's sidehulls have rather boat shaped pointed bows and truncated sterns, as seen in outline in a horizontal waterline cross section of a sidehull, in its preferred embodiment. This compares to the SECAT where each of SECAT's sidehulls have a rectangular footprint on the water surface as can be seen in FIG. 11, page 306, of the preceding referenced SECAT article. Further, the aforementioned new concept vertical steps in the sidehulls of the instant invention will greatly limit the increase of wetted area resistance on the outside or sea surface sides of the sidehulls when operating in heavy seas. Neither of the just mentioned advantages of the instant invention reduce its performance and will, indeed, provide for at least reasonably good conventional catamaran-like hull performance with the blower system off. That is because the relatively shallow gas cushions and optional recess seal members make for much more hull like undersurfaces than did the SECAT's twin air cushion design. That is because the SECAT's design used full, to the wetdeck, depth recesses with full depth flexible seals fore and aft. That design used parallel thin sideboards, that extended all the way to the wetdeck, to form each side of the catamaran sidehulls. It can easily be seen that the SECAT's design must have functioned much like a lilypad with the blowers off.

The use of seals to divide portions of the recess also offer advantages. They reduce the amount of recess surface wetting when operating in heavy seas. This is particularly so when the preferred inverted-V seal design is utilized since such a shape has its lowest point at the sidehull sides thereby directing waves away from recess vertical surfaces downstream of the inverted-V seals. The recess seals also provide fore and aft smaller recesses that can be pressurized differently to help trim the vessel. The differential pressurization is accomplished by use of pressure control valves that are directed by an on-board controller that senses hull orientation and pressures in the recesses.

The instant invention also offers a center bow disposed inward, and generally in part forward, of the sidehulls. This offers significant additional advantages. The first is in appearance where a rather yacht-like pointed bow, as seen from topside or in profile, can be realized if the center bow extends forwardly. The second is in providing good ride qualities in rough seas in that the center bow helps to prevent bow pitch down of the boat in heavy seas. The third is that the center bow helps prevent wetdeck slamming when running in very heavy seas as it tends to lift the forward part of the boat as a large wave is encountered and then directs the wave away from the wetdeck.

Lake, U.S. Pat. No. 1,307,135, uses dual gas cushion floats with the floats supplied with exhaust gas from an engine. Lake's main intent is to make a device to aid in performance of a seaplane, or hydroaeroplane as he calls it, when the seaplane is either waterborne or airborne as can be realized upon examination of lines 96-106, page 2, of his patent which states: "Furthermore, it will be appreciated, that when the hydroaeroplane is in flight through the air, a corresponding entraining action will ensue between the aquafoils and supporting pressures, supplemented of course by the exhaust pressures, and the resulting diminution in frictional resistance, in this instance, will be measurable because of the relatively lighter density of the elastic fluid which is thus introduced between the aquafoils and the air pressure.". This is further shown by lines 22-24, page 2, of Lake which states: The float is shown as supporting a fuselage 8 by struts 9, and aerofoils representing a supporting unit are indicated by 10.". The supporting unit 10 is actually the wing of an aircraft. While his invention can also be applied to marine surface craft, it is obvious that much of the inventive thrust was directed at the seaplane or hydroaeroplane application which led to limited use as a marine surface craft. Applicant's invention has a distinctive racy yacht-like boat look with a pointed main bow and catamaran-like sidehulls that are flush with the boat sides in its preferred embodiment.

Some particular points regarding Lake's invention compared to applicant's instant invention are now noted. The gas cushion in each of Lake's floats are rectangular as seen in a calm sea surface waterline, when the float is pressurized with gas, and has parallel sides 2 and 3 over the length of the gas cushion. It is a preferred arrangement of applicant's invention that gas cushions be narrower, normally at least twenty-five percent, forward than aft which allows for a fine entry bow with little increase in wetted area on the lower surfaces of the bow at the bow portions of the recess. Further, also in the preferred embodiment of applicant's instant invention, a gas cushion bounding side of a catamaran-like sidehull would expand outwardly from its forward portions and then become more parallel over its aft portions. This allows for a finer entry forward coupled with most gas cushion bottom water contacting surface area and best streamlining aft. Further, when operating with the gas cushion pressurized and at high speeds, planing speeds for example, in calm seas the pointed bow portions of Lake's invention would be well clear of the water and the forward water contacting surface would be the transverse aft section of his forward bow 4 only. Applicant's preferred embodiment has a narrower bow shaped portion in water contact at high and low speeds. For purposes of applicant's instant invention, high speeds are defined as speeds of more than 25 knots.

Lake offers a series of transverse aquafoils 6 separated by spaces 7 across the lower portions of his gas cushions. Since there aquafoils must also serve as aerofoils when his craft is airborne and must further help direct exhaust gas flow out from the underside of the float they are separated and airfoil shaped. Therefore, he does not have separate recesses in a float whereas applicant's instant invention, in its preferred embodiment, utilizes separate recesses in each catamaran-like sidehull which, prefereably, can be supplied with gas at different pressures to aid in control of boat motions. Importantly also, Lake's aquafoils 6 are planar over their entire width, as seen in vertical transverse planes of his vehicle, which makes for a hard jarring ride in rough seas as compared to applicant's preferred embodiment angled recess seal surfaces. There are numerous other innovations in applicant's instant invention that offer dramatic improvements over both SECAT and Lake as are presented hereinafter.

Applicant has discussed all of the other related art in his earlier single hull Air Ride boat hull patent applications. The instant invention offers advancements over applicant's earlier inventions as well as over the prior art. These advancements are discussed in some detail in the following sections.

SUMMARY OF THE INVENTION

The object of the instant invention is to offer the advantages of previous Air Ride boat hull inventions coupled with further improvements in stability and performance that are related to use of separated substantially parallel catamaran-like sidehulls where such sidehulls contain separate gas recesses in their undersides.

A related object of the invention is that the sidehulls can be substantially boat shaped with an essentially pointed bow shape when viewed in a plane that intersects a calm sea waterline when the boat is underway at high speed.

It is an important related object of the invention that the sidehull keels and/or outer water contacting surfaces diverge outward from forward and become parallel over at least a part of their after portions.

It is also a related object of the invention that the sidehulls can be either symmetrical or asymmetrical.

It is another related object of the invention that the sidehulls be separated by a connecting hull structure that is at least mostly clear of the water surface when the boat is in operation.

Another object of the invention is that a center bow can be utilized where such a center bow adds to vessel fore and aft stability and reduces wetdeck wetting especially when the vessel is operating at high speeds in heavy seas.

A related object of the invention is that the center bow can extend forwardly of the sidehulls.

It is also an object of the invention that the center bow can be made with different shapes such as the preferred deep-V, inverted-V, or others.

It is another object of the invention that the sidehulls can be substantially boat shaped at the waterline with an essentially pointed bow and a truncated stern.

Yet another object of the invention is to offer substantially vertical steps that reduce the amount of vertical surface wetted sidehull area when operating in rough seas.

It is a related object of the invention that ambient air is fed downward into the vertical steps.

A further related object of the invention is to slant the vertical steps so that water is directed not only outward from the sidehull but also downward thereby adding lift to the sidehull.

Another important related object of the invention is that the shape of a sidehull can be made wider forward and narrower aft in way of the vertical steps thereby reducing the rearward force of spray impinging on the sidehull steps.

An object of the invention that is related to that just preceding is to have the sidehull full width below the narrowing stepped portion thereby giving a full width gas cushion and hence a full width lifting surface while still offering the advantage of tapered sidehull sides in way of the vertically oriented vented steps.

Yet another object of the invention is to provide an air flow turbulence generator on the underside of the wetdeck to thereby restrict air flow under the wetdeck and as a result cause a buildup of static air pressure lifting force under the wetdeck.

A further object of the invention is to provide movable bow and/or recess seals that are movable in relation to the sidehulls.

Yet another object of the invention is to provide a movable bow seal that can be utilized in conjunction with a pointed bow shape forward of the movable bow seal thus allowing for a simple fixed wave piercing bow with its related low cost and attractive appearance.

It is an object of the invention that the movable bow seal concept could include a series of seals or elements with each being able to follow the water surface thus creating an efficient gas seal.

Another object is that the bow seals be able to seal themselves from the side and also that following seals help in the sealing of seals preceding them.

Yet another object of the invention is that the movable bow seals have trailing surfaces that curve or angle to match movement of a following seal thus resulting in good sealing of pressurized gas in the gas cushion.

A related object of the invention is that the movable seals be made of structurally strong materials which is possible since it is not necessary that such movable seals utilize flexible materials for construction.

Yet another advantage of the optional movable seals of the instant invention is that the movable seals can be attached by hinges or other simple means to the hull.

It is also an object of the invention that the optional movable bow seals be made with shaped lower surfaces, such as a preferred shape inverted-V, to provide good water surface tracking and reduced wave impact loadings.

It is a further object of the invention that secondary bow shaped members can be interspersed in the gas cushion recess to assist in providing hull stability and also help break up waves under the hull when operating in rough seas.

It is a related object of the invention that the secondary bow shaped members can be shaped like inverted-V's with their lower portions located proximal the sidehull's sides thus adding to hull stability in roll as well as reducing inside of recess wetting downstream of the inverted-V seals.

An object of the invention related to the immediately preceding is to provide for the secondary bow shaped member inside of the recess to be biased, or lower, to the outboard side than the inboard side of the recess thereby adding further to roll stability of the boat.

Further, it is an object that a structurally sound and reliable fixed stern seal be utilized that can optionally incorporate movable stern seal element(s) to aid in gas sealing, controlling of vessel trim, and/or directing water flow to a propulsor that is positioned aft of the movable stern seal element.

Related is the object that the fixed stern seal can have a lower surface that is somewhat more flat than a forward portion of the fixed stern seal thus providing a high efficiency planing surface for the aft end of the boat to ride on.

Yet another related object is to provide a stern seal with a lower surface that has a low wave impact, at least partial, V-shape when seen in operation from a bottom plan or fisheye view.

A related object is to provide for an inset into the stern seal that will reduce the high resistance wetted area of the stern seal.

A further related object is to provide a means to supply pressurized gas to the inset in the stern seal.

A further object of the invention is to have a fixed structural portion of the stern seal extend, in mathematical summation of its parts, across a majority of the width of the recess.

A related object of the invention is to have fixed structural portions of the stern seal, as seen in a vertical transverse plane of the hull, be angled to horizontal over a majority of their width to reduce wave impact forces in rough seas.

It is yet another object of the invention that gas pressure control means can be incorporated that can regulate gas pressure in at least portions of the recesses.

A directly related object of the invention is that regulation of gas pressure in such recess portions can help in maintaining best trim of the the vessel in heavy seas.

A further related object of the invention is that a controller be used to control operation of gas pressure control means that in turn controls gas pressures in the recesses.

Yet another related object of the invention is that the just mentioned controller receive as inputs hull orientation and values of pressures in the hull recesses.

The invention will be become better understood upon reference to the drawings and the detailed description of the invention which follow in which:

BRIEF DESCRIPTION OF THE DRAWINGS

FIG. 5 presents a cross sectional view of the port sidehull, as taken through line 5—5 of FIG. 2, that shows drive engine and propulsor, a gas pressurization system including drive motor and blowers, blower inlet control valves, fixed recess seals, and gas vented stern seal. Also shown is a controller that receives inputs from pressure transducer(s) that monitor recess pressures. The controller processes recess pressure information coupled with optional information from a gyrostabilizer, internal to the controller in this instance, to arrive at outputs that direct blower flow control valves that are also shown. The result of this is that pressures in various recess portions can be controlled to thereby dramatically improve pitch, roll, and heave of the boat.

FIG. 6 is a starboard sidehull cross sectional view, as taken through line 6—6 of FIG. 2, that shows similar items to those presented for the port sidehull in FIG. 5 except that the sidehull is pitched bow up in rough seas. Further, the starboard sidehull utilizes movable seals that, in this preferred instance, follow the water surface to provide best gas sealing. It is to be noted that the movable seals need not extend below a keel line of the sidehull and that they can constitute a forward portion of a sidehull. Also shown in FIG. 6 is a controllable movable aft seal member that can not only effect the level of water in the recess but also effect the level of water reaching the surface drive propulsor that is used in this instance.

FIG. 7 presents a top plan view, with the deck removed, of a boat to the instant invention. Shown are the main engines and propulsors, blowers and drive engines, blower flow control valves, blower interconnecting ducts and valves, and controller. Shown also are a top side of the wetdeck, center bow member, and air flow turbulence generators.

FIG. 8 is a cross sectional view of the port sidehull, as taken through line 8—8 of FIG. 4, that shows details of typical vertically oriented air vented steps as seen in a horizontal plane. It is to be noted that in this example the outboard side of the port sidehull tapers inward going aft. That is the preferred embodiment of the sidehull shape of the invention and offers least forward resistance to impinging water spray. Also shown in FIG. 8 are pressurized gas flow ducting.

FIG. 9 presents a bow on view of an Air Ride boat to the preferred version of the invention. This view shows a very deep-V center bow, sidehulls, and the interconnecting wetdeck.

FIG. 10 shows a stern view of an Air Ride boat to the instant invention which also shows the propulsors. Further shown in FIGS. 9 and 10 are the water spray patterns that come off the hull when operating at high speeds in calm seas.

FIG. 11 is a cross sectional view, as taken through line 11—11 of FIGS. 2, 5, 6, and 7 that shows the aft powered blowers, interconnecting duct system and its valve, movable seal in the starboard sidehull and generally inverted-V shape in a port sidehull recess. It is important to note that the invented-V shape shown is biased with more substance on the outboard side of the port sidehull. This biasing adds to overall hull stability in roll since a larger lift force is generated on more outboard surfaces when they are in water contact.

FIG. 12 presents a cross sectional view, as taken through line 12—12 of FIGS. 2, 5, 6, and 7, that shows forward blower air inlets and blower gas flow control valves. Also shown are a forward movable seal member in the starboard sidehull and an inverted-V shape that makes up part of a port sidehull recess surface. Of course, other shapes than inverted-V are usable; however, the inverted-V shape offers advantages in that it appears to offer best rough water ride qualities and also directs water away from inside surfaces of the following recess.

FIG. 13 offers a cross sectional view of the forward movable seals of the starboard sidehull, as taken through line 13—13 of FIG. 2, that shows four forward movable seal elements in extended positions during rough water operation. FIG. 13 shows the general construction and operation of these movable seals. The last of the forward movable seals is controlled by an actuator in this instance.

FIG. 14 presents an isometric view, as taken from above and from inside a recess, of the seals offered in FIG. 13. The optional actuator is not shown in this view.

FIG. 15 is a cross sectional view of the intermediate movable seals of the starboard sidehull, as taken through line 15—15 of FIG. 2, that shows those seals in a retracted position. The construction of these seals is different, in this instance, from those presented in FIG. 13. These seals offer a preferred construction method that utilizes a closed cell foam core and a rigid outer skin. This preferred seal construction concept is light, strong, buoyant, and resistive to water absorption.

FIG. 16 offers a cross sectional view, as taken through line 16—16 of FIG. 2, of a version of an aft movable seal. In this example the seal positioning is controlled by an actuator such as a fluidic cylinder.

FIG. 17 presents a cross sectional view, as taken through line 17—17 of FIG. 2, of another possible variant of a movable aft seal that utilizes a reactive dash-pot damper to affect movement of the aft movable seal. It is to be noted that a simple spring, not shown, could also be used as a reactive member.

FIG. 18 is a cross sectional view, as taken through line 18—18 of FIG. 2, that shows a preferred embodiment of a movable aft seal that utilizes a simple gas pressure bellows to control the aft seal. The actual water contacting member is in reality a plate like member of fiberglass or other material in the preferred embodiment of the invention.

DETAILED DESCRIPTION

With reference to each of the aforementioned figures in turn, and using like numerals to designate similar parts throughout the several views, a preferred embodiment and several alternative embodiments will now be described.

Figure 1:
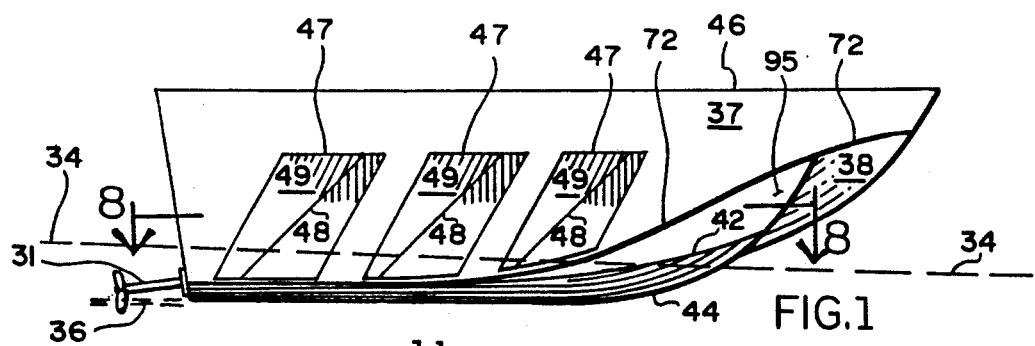
FIG. 1 presents a profile view of a boat hull to the instant invention. This profile view shows a boat that is rather conventional looking, particularly above the waterline, with a pointed bow. It also shows the optional vertically oriented air vented steps in the side of the hull that can be applied to greatly reduce wetting of the side of any boat.

FIG. 1 discloses a profile view of the starboard side of a boat 37 to the instant invention that is running in a calm sea as shown by sea surface waterline 34. Shown is the starboard sidehull 95, sidehull chine 42, main hull upper chine 72, main hull center bow 38, deck line 46, transom 97, propulsor 31 (in this case a surface propeller drive), adjacent to the hull water surface 36, and vertically oriented air vented step compartments 47. The vertically oriented ventilated step compartments 47 include an angled step line 48 and a tapered vertically oriented step 49 in these preferred embodiments. The vertically oriented ventilated steps 47 reduce the wetted area of the starboard sidehull 95 as can be seen by examination of the sea surface waterline 34. This reduction of wetted surface area can be even more pronounced when operating in rough seas.

Figure 2:
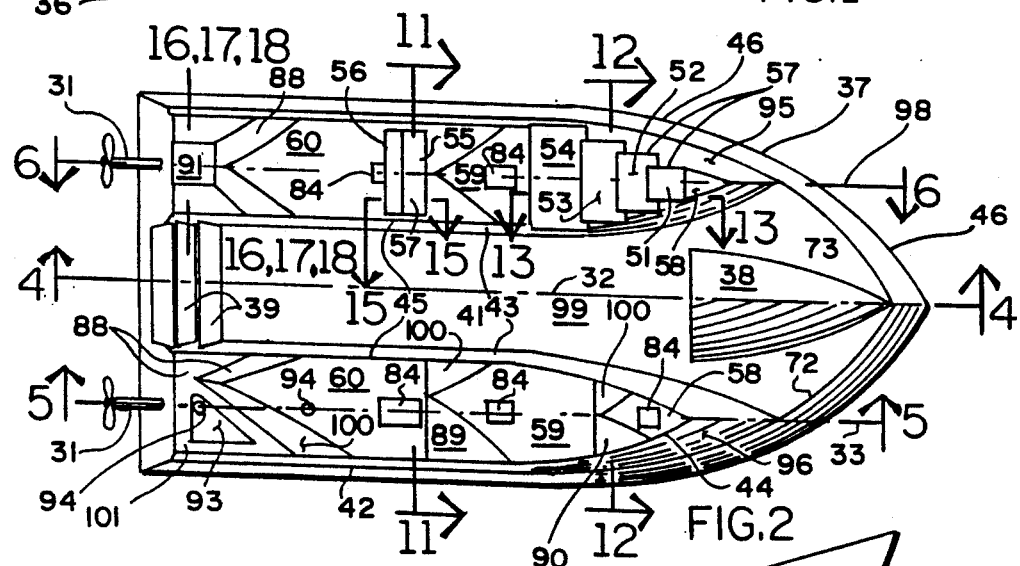
FIG. 2 offers a bottom plan view of a boat to the instant invention with catamaran-like sidehulls connected by a hull structural member that has on its underside a wetdeck, including a turbulence generator near its aft end, and a forward center bow. This particular variant shows fixed inverted-V shaped recess seals in the port sidehull and a combination of movable, relative to the boat hull, seals and fixed seals in the starboard sidehull. It would normally be preferred to utilize the same seal configurations in both sidehulls; however, a combination such as is shown would be quite workable.

FIG. 2 presents a bottom plan view of a boat 37 that shows the connecting hull structure 99 whose underside is the wetdeck 41 which includes an air flow turbulence generator 39. The connecting hull structure 99 is normally in mechanical communication with the center bow 38, port sidehull 96 and starboard sidehull 95 in the preferred embodiment of the instant invention. The wetdeck 41 is also bounded by the transom 97 and main hull upper chines 72 and 73 in this instance. The center bow is preferably centered around the boat's vertical centerline plane 32; however, more than one center bow 38 can be used and the center bow 38 need not be centered around the boat's vertical centerline plane 32. The boat 37 has a vertical centerline plane 32, a port sidehull vertical centerline plane 33, and a starboard sidehull vertical centerline plane 98. Also shown are the deck line 46, propulsors 31, sidehull outer chines 42 and inner chines 43, sidehull outer keels 44 and inner keels 45, pressurized gas supply ducts 84, and sidehull forward recesses 58, intermediate recesses 59, and aft recesses 60. It is to be noted that any number of recesses, from one to many, can be incorporated into either sidehull 95 and 96 and that other hull members, such as the center hull 38, can also include pressurized gas recesses if desired.

FIG. 2 also shows the port sidehull recess with fixed angled to a preferred inverted-V shape, as seen in a vertical transverse plane of the hull, seals. These fixed seals are forward seal 90, intermediate seal 89, and aft seal 88. Angled seal portions 100, as seen in a vertical transverse plane of the boat, compare to more horizontal lower seal portions 101. The use of more angled surfaces 100 forward gives best ride qualities in rough seas while the more horizontal lower surfaces 101 give best hydrodynamic efficiencies so the combination is warranted. The port aft seal 88 includes an inset 93 that is supplied with pressurized gas from a recess 60 or other source by conduit 94. Supplying the inset 93 with pressurized gas makes a gas layer in the inset 93 and thereby reduces port aft seal 88 wetted area and hence wetted area resistance.

FIG. 2 further presents an optional sealing means in the starboard sidehull 95 that uses movable, in relation to the starboard sidehull 95, seals. These are forward movable seals 51, 52, 53, and 54, intermediate movable seals 55 and 56, and aft movable seal 91. Substantially vertical, or parallel, sidehull inside surfaces 57 are normally used next to the movable seals and sidehull inside surfaces can diverge aft of such parallel sidehull inside surfaces 57 proximal the movable seals 51, 52, 53, 54, 55, and/or 56. Further descriptions of functions of these movable seals is given in following paragraphs; however, their primary intent is to provide better gas sealing than is possible with the fixed seals shown in the port sidehull. The starboard sidehull 95 may be truncated forward and not have a pointed bow as is shown. An optional variation of the instant invention is that a bow of a sidehull could be partially truncated so that there is little or no pointed center bow of a sidehull forward of the movable seal 51.

Figure 3:
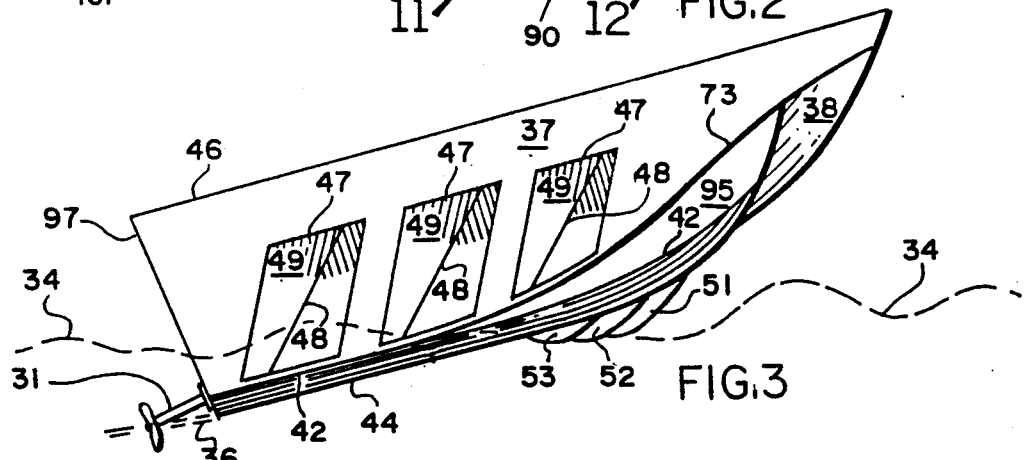
FIG. 3 provides a starboard profile view of the hull of FIG. 2 when said hull is operating in heavy seas with its bow pitched upward. It is to be noted that the movable seals forward in the starboard sidehull have extended below the sidehull to aid in sealing of the pressurized gas in a starboard sidehull recess.

FIG. 3 shows a starboard side profile view of the boat 37 when operating in heavy seas as seen by sea surface waterline 34. The center bow 38 is pitched up in this instance. It can be seen that the starboard sidehull 95 forward movable seals 51, 52, and 53 have extended downward below a keel line 44 to aid in sealing of pressurized gas. Also shown are the starboard sidehull chine 42, main hull upper chine 73, deck line 46, adjacent to hull water surface 36, transom 97, and propulsor 31. Vertically oriented air vented step compartments 47 which include an angled step line 48, and tapered vertically oriented steps 49 are also shown. Other configurations of vertically oriented ventilated steps are, of course, possible.

Figure 4:
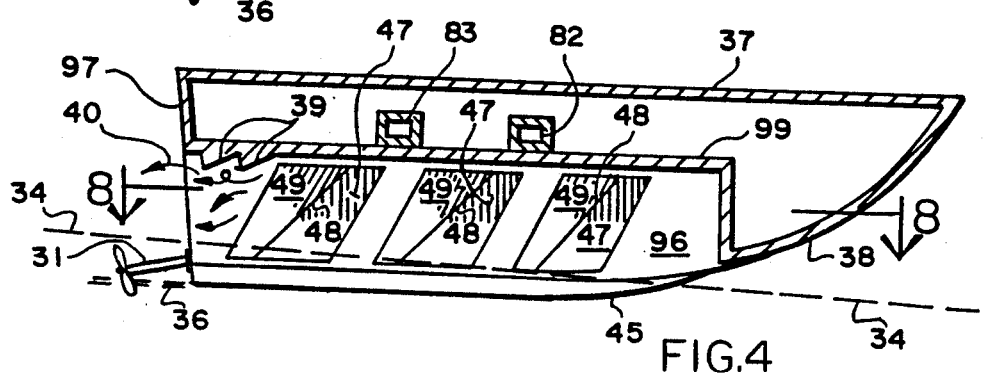
FIG. 4 is a centerline cross sectional view, as taken through line 4—4 of FIG. 2, that shows vertically oriented air vented steps in the inside surfaces of the port sidehull. Also shown are a forward center bow, wetdeck air flow turbulence generator, and pressurized gas connecting passageways.

FIG. 4 presents a cross sectional view, as taken through line 4—4 of FIG. 2, that shows the elevation of the wetdeck 41 aft of the center bow 38 where the center bow helps prevent wave slamming into the wetdeck 41. The wetdeck 41 is actually the underside of the connecting hull structure 99. It is important to note the air flow turbulence generator 39 and its effect on air flow, as shown by air flow arrows 40. The generated turbulence reduces air flow area and thereby increases air static pressure forward of the air flow turbulence generator 39 thus creating an added lift force acting on the wetdeck 41. The effect of this, of course, is to increase overall efficiency of the boat 37. Shown also are the vertically oriented ventilated step compartments 47, step lines 48, and vertically oriented steps 49 that are on the inside of the port sidehull 96. Further shown in FIG. 4 are the sea surface waterline 34, propulsor 31, transom 97, and gas pressurization cross flow ducting forward 82 and aft 83.

FIG. 5 shows a cross sectional view, as taken through line 5—5 of FIG. 2, that shows workings of the port sidehull 96 gas pressurization system and other features. The gas pressurization system shown here includes a gas pressurization device or blower drive motor 69, forward blower 67, forward gas flow control valve 75, gas inlet duct 86 gas discharge duct 85, aft blower 68, and aft flow control valve 76. The forward blower 67 supplies pressurized gas to the forward recess 58 and intermediate recess 59 in this instance and the aft blower supplies pressurized gas to the aft recess 60.

It is possible to regulate gas pressures in the recesses 58, 59, 60 by use of the gas flow control valves 75 and 76. The operation of these valves is normally directed by a controller 79 that receives as inputs recess pressure readings from pressure transducers 87 through connectors 92. The controller 79 would also normally receive hull orientation data (pitch, roll, and yaw values) from a gyrostabilizer (not shown) and g-force acceleration values from an accelerometer (not shown) that would normally be mounted internal to the controller 79. The controller 79 processes said information and in turn sends out directing signals to the gas flow control valves 75 and 76. Controller function is such that if a pitch down by the bow condition is encountered that the controller 79 would open forward gas flow control valve 75 fully and restrict flow through the aft gas flow control valve 76. Such action would increase the gas pressure in forward recess 58 and intermediate recess 59 and decrease gas pressure in aft recess 60 thereby returning the boat 37 to a more normal trim. It is to be noted that gas flow control valves can be located between the blowers 67 and 68 and the recesses 58, 59, and 60 if desired. Also, gas flow control valves can be positioned to vent pressure from the recesses 58, 59, and 60 to accomplish the same thing although such an arrangement would not be as efficient as it would waste blower power.

Also shown in FIG. 5 is an inset 93 into a fixed stern seal 88 more horizontal lower surface 101 that is supplied with pressurized gas from aft recess 60. A fixed intermediate seal 89 and fixed forward seal 90 are also shown. More angled seal surfaces 100 are also shown. Gas flow is shown by gas flow arrows 74. Other items shown in FIG. 5 include a sea surface waterline 34, adjacent to hull water surface 36, recess surface waterline 35, propulsor 31, main drive engine 30, sheer or deck line 46, and center bow 38.

FIG. 6 presents a cross sectional view, as taken through line 6—6 of FIG. 2, of the starboard sidehull 95. For purposes of illustration, the boat 37 is shown in a bow pitched up orientation that can occur when running in a rough sea as is show by sea surface waterline 34. The advantages of using movable forward seals 51, 52, 53, and 54 here are made clear as such seals restrict gas flow leakage from intermediate recess 59 when the hull is clear of the water. It can be seen that, in this example, the forward recess 58 is clear of the sea surface 34 and therefore loses its pressurized gas until reentry into the water occurs. Also shown are intermediate movable seals 55 and 56 which are riding on recess waterline 35 in this example. It is to be noted that movable seal hinge pins 50 are shown in movable seals 51 and 55 only in this sidehull centerline view. Refer to FIG. 14 for a more detailed description of the workings of the movable seals and their hinge pins. An aft movable seal 91 that is controlled in positioning by actuator 62 is also shown. The aft movable seal 91 can help control the level of water in the aft recess 60 and can also aid in direction of water flow to the surface propeller propulsor 31 in this instance.

FIG. 6 also shows the gas pressurization and control system. This includes a blower drive motor 61, forward blower 67, forward gas flow control valve 77, aft blower 68, aft gas flow control valve 78, inlet gas flow ducting 86, outlet gas flow ducting 85, gas flow arrows 74, pressure transducers 87, controller 79, and connectors 92. The operation and function of this gas pressurization system is basically the same as that described under FIG. 5 so the reader is referred to that preceding description. However, FIG. 6 adds that the controller 79 can also direct movement of a movable seal such as aft movable seal 91 by directing operation of actuator 62. Further shown in FIG. 6 are a main drive motor 30, center bow 38, and deck line 46.

FIG. 7 is a top plan view of the inventive boat 37 with the deck removed. Shown, from the topside, are the starboard sidehull 95, port sidehull 96, wetdeck 41, air flow turbulence generator 39, center bow 38, connecting hull structure 99, deck line 46, transom 97, propulsors 31, and main drive engines 30. Also shown are the port sidehull vertical centerline plane 33, starboard sidehull vertical centerline plane 98, and the boat vertical centerline plane 32. It is to be noted that the center bow 38 does not have to extend either forward of the sidehulls 95 and 96 and that the sidehulls 95 and 96 can actually extend forward of the center bow 38. Further, a center bow 38 can be positioned proximal an aft portion of the wetdeck 41 if desired.

FIG. 7 also presents a topside view of a preferred gas pressurization system layout. In this system the port side blowers 65 and 66 are driven by port side blower motor 61 with gas flow to the blowers controlled by gas flow valves 75 and 76. Starboard side blowers 67 and 68 are driven by blower drive motor 69 and flow to the blowers is controlled by gas flow control valves 77 and 78. There are also interconnecting ducts 82 and 83 that insure that pressurized gas is available to the port sidehull 96 in the event of failure of the port side blower motor 61 or vise versa. There would normally be valves 80 and 81 placed in the interconnecting ducts 82 and 83. Operation of the gas flow control valves 75, 76, 78, 79, 82, and 83 is orchestrated by a controller 79 through connectors 92.

FIG. 8 presents a cross sectional view of the port sidehull, as taken through line 8—8 of FIG. 4, that shows operation of the vertically oriented air vented step compartments 47 similar to those shown in profile in FIGS. 1, 3, and 4. These step compartments 47 noticeably reduce the wetted area of a sidehull (or a single hull for that matter) and hence reduce the overall wetted area resistance of the hull. It is to be noted that the inboard side (lower side in FIG. 8) of the port sidehull is substantially parallel to the vertical centerline plane 33 of the port sidehull in way of the vertically oriented air vented step compartments 47 while the outboard side (upper side in FIG. 8) tapers inward toward the vertical centerline plane 33 as it goes aft toward the transom 97. There is good reason for tapering the sides inward. The reason is that this either reduces or eliminates the rearward resistive force caused by impingement of water, as shown by horizontal plane adjacent to the hull water surfaces 36, from preceding vertically oriented steps 49 onto following vertically oriented steps 49. Of course, vertically oriented step compartments 47 and/or the inward tapering of a side can be done on either or both sides of a sidehull and can also be applied to the center bow of other areas if applicable.

Examination of FIG. 8 also shows that the outer chine 42 remains substantially parallel to the inner chine 43, both are substantially parallel to the vertical centerline plane 33, in the preferred embodiment of the invention. Examination of FIGS. 1, 3, and 4 shows that the vertically oriented air vented step compartments 47 actually stop at or above the chines 42 and 43 in the preferred embodiment of the instant invention. This allows for a wider more efficient gas cushion and/or hull structure footprint on the water surface. Also shown in FIG. 8 are the angled step lines 48 and gas flow ducts 85.

FIG. 9 presents a bow view of a boat 37 to the preferred embodiment of the instant invention. Shown are the deck line 46, starboard sidehull 95, port sidehull 96, center hull 38, connecting hull structure 99, wetdeck 41, hull upper chines 72, 73, sidehull outer and inner chines 42 and 43, sidehull outer and inner keels 44 and 45, adjacent to hull water surface 36, sea surface waterlines 34, vertical centerline plane of the boat 32, port sidehull vertical centerline plane 33, and starboard sidehull vertical centerline plane 98. As can be seen from FIG. 9, the instant invention offers a very high wave clearing distance from the sea surface 34 to the wetdeck 41.

FIG. 10 provides a stern view of the preferred embodiment of the instant invention. The same items that are listed under FIG. 9 immediately preceding are shown in FIG. 10 so that nomenclature will not be repeated here and the reader is referred to the preceding paragraphs. FIG. 10 also shows typical propulsors 31.

FIG. 11 presents a cross sectional view, as taken through line 11—11 of FIGS. 2, 5, 6, and 7, that shows a typical cross section as taken through the aft blowers 66 and 68. Shown are the blower discharge gas flow ducts 85, interconnecting gas flow ducts 83, interconnecting valve 81, and gas flow arrows 74. Also shown are the sea surface waterline 34, recess waterline 35, adjacent to hull water surface 36, port sidehull 96, starboard sidehull 95, connecting hull structure 99, wetdeck 41, sidehull outer chines 42, sidehull inner chines 43, sidehull outer keels 44, sidehull inner keels 45, sidehull aft recesses 60, and deck line 46.

FIG. 11 also shows the starboard sidehull 95 having a movable seal member 55 that has an inverted-V shape on its underside. An intermediate movable seal 55 would normally operate between substantially parallel or vertical inside surfaces 57 as are shown in the starboard sidehull 95. It is normally desirable to have some shape to the underside of a movable seal member, over at least part of its length, to provide best ride qualities in rough seas. Examination of the port sidehull 96 shows a preferred inverted-V shape to the upper surfaces of the aft recess 60. In this preferred embodiment, the recess surface is biased toward having more material on the outboard side than the inboard side. That is actually done on purpose since such biasing gives more lifting forces, when in water contact, outboard to the boat which adds to roll stability (i.e., lifting forces are further outboard from the boat's vertical centerline plane 32 resulting in a greater restoring roll moment). Also shown in FIG. 11 are the port sidehull vertical centerline plane 33 and the starboard sidehull vertical centerline plane 98.

FIG. 12 presents a cross sectional view, as taken through line 12—12 of FIGS. 2, 5, 6, and 7, that shows a section taken through the forward gas flow control valves 75 and 77. Shown also are gas inlet flow ducts 86, gas flow arrows 74, starboard sidehull 95, port sidehull 96, interconnecting hull structure 99, wetdeck 41, deck line 46, sidehull outer chines 42, sidehull inner chines 43, sidehull outer keels 44, sidehull inner chines 45, sea surface waterline 34, recess waterline 35, adjacent to hull water surface 36, forward movable seal member 35, forward recesses 58, boat vertical centerline plane 32, port sidehull vertical centerline plane 33, and starboard sidehull vertical centerline plane 98. FIG. 12 shows operation in rough seas with the port sidehull 96 recess 58 clear of the water and therefore vented of pressurized gas while the starboard sidehull 95 recess retains gas pressure since its movable seal 52 extends downward below the keels 44 and 45 and thus at least partially seals against gas leakage. A forward movable seal 52 would, in the preferred embodiment, function between substantially parallel inside surfaces 57 of a sidehull as are shown in this starboard sidehull 95.

FIG. 12 also shows a biasing of the upper surfaces of recess 58 in the port sidehull 96 in a similar manner as that shown in FIG. 11 so the same reasoning for doing so is followed here as was given in the preceding discussion of FIG. 11. Note that the outward biasing of recess surfaces is not necessary for function of the invention and that symmetrical recess surfaces or, indeed, biasing of recess surfaces toward the inboard sides of the recesses can also be utilized. It is given as a definition of this invention that recess and/or fixed seal surfaces are considered to have an inverted-V shape so long as they intersect, either directly as shown in the port sidehull 96 of FIGS. 11 and 12 or as extensions of sidehull surfaces so long as such intersection occurs below a deck line 46 of the boat 37. Further, though preferred, it is not necessary that sidehull sides be symmetrical about their vertical centerline plane for the instant invention to function.

It is important to note from observation of FIGS. 5, 6, 11, and 12 that average recess depth (distance above sidehull keels 44 and 45) is significantly less than the depth of the wetdeck 41 above the sidehull keels 44 and 45. This is a very important characteristic of the instant invention as compared to the SECAT, described under the preceding BACKGROUND OF THE INVENTION section of this document, where the depth of the wetdeck and the depth of the recess are the same. The SECAT utilizes full depth flexible seals fore and aft in each sidehull recess in order to allow waves to pass through essentially unmolested so long as they are less than wetdeck height. The preferred embodiment of the instant invention parts the waves with a pointed ship like bow at the forward end of each sidehull and thereby directs them away from the recess. Therefore, the instant invention can utilize average recess depths that are only half or less of wetdeck depth. Actually, twenty-five percent of wetdeck depth is considered a reasonable and workable number in most cases for the instant invention. The advantages of the shallower recesses of the instant invention are several, they include: 1) shallower draft with the blowers off, 2) an inherently stronger and lighter structure, and 3) better ride and handling characteristics with the blowers off.

FIG. 13 is a cross sectional view, as taken through line 13—13 of FIG. 2, that shows the starboard sidehull 95 forward movable seals 51, 52, 53, and 54 in their extended downward position and in contact with the sea surface waterline 34. These forward movable seals 51, 52, 53, and 54 are attached to the sidehull recess 58 structure by hinge pins 50 in this instance. Only the most forward movable seal 51 shows the hinge pins 50 as the other hinge pins 50 do not pass through the sidehull centerline in this configuration. Operational control of the aftermost forward movable seal 54 is shown being accomplished by an actuator 62 in this case although and actuator is not necessary for function. It is also possible to use spring biased systems, dashpots, etc. (not shown) to provide restoring forces to one or all of the movable seals.

FIG. 14 presents an isometric topside view of the forward movable seals 51, 52, 53, and 54 of FIG. 13 but in their retracted position. This clearly shows that, in this preferred embodiment of the instant invention, the movable seals not only overlap fore and aft but also overlap on their sides which is the preferred situation as it prevents gas flow leakage sideways from a recess when the recess is clear of the water surface. FIG. 14 also shows best attachment means in the form of movable seal hinge pins 50. It is to be noted that the hinge pins 50 do not extend through movable seals 52, 53, and 54 as such would preclude the movement of seals 51, 52, and 54 in this instance.

FIG. 15 presents a cross sectional view, as taken through line 15—15 of FIG. 2, that shows the intermediate movable seals 55 and 56 disposed in aft recess 60. In this case the movable seals 55 and 56 are following the recess waterline 35 and the movable seals 55 and 56 are retracted. Also shown is a movable seal hinge pin 50. The method of construction of these aft movable seals 55 and 56 involves a closed cell foam filler 70, and skin covering 71. This method of construction provides a very light weight and strong movable seal structure that is impervious to moisture since, in the preferred version, a closed cell plastic foam is used for the filler 70. This method of construction would preferably be applied to manufacture of all movable seals; however, other means of seal construction, including use of flexible seal materials could be utilized.

FIG. 16 is a cross sectional view, as taken through line 16—16 of FIG. 2, that shows an actuator 62 used to position an aft movable seal 91 in the starboard sidehull 95. It is to be noted that some shape is provided in this particular version of the aft movable seal 91. Also shown in FIG. 16 are the sidehull chines 42 and 43, sidehull keels 44 and 45, recess waterline 35, and adjacent to hull water surface 36.

FIG. 17 presents a cross sectional view, as taken through line 17—17 of FIG. 2, where items shown include an optional dash-pot shock absorber 63, starboard sidehull 95 aft movable seal 91, sidehull chines 42, sidehull keels 44, recess waterline 35, and adjacent to hull water surface 36. Again, some shape has been added to the underside of the aft movable seal 91 to reduce water impact loadings in rough seas. It is to be noted that a simple spring (not shown) or other force biasing means could be used in place of the shock absorbing dash-pot 63 shown.

FIG. 18 is a cross sectional view, as taken through line 18—18 of FIG. 2, that shows the preferred embodiment gas spring bellows 64 means of positioning the movable aft seal member 91 in starboard sidehull 95. The advantage of using the gas spring is: 1) pressurized gas is already available on board the boat, 2) the gas bellows not only acts as a shock absorbing member but also does the positioning of the movable aft seal, and 3) positioning of the movable aft seal 91 can easily be controlled using outputs from the controller presented in FIGS. 5, 6, and 7 to regulate a gas pressure valve (not shown) that regulates pressure in the gas bellows 64. Also shown in FIG. 18 are the sidehull chines 42 and 43, sidehull keels 44 and 45, gas flow arrow 74, recess waterline 35, and adjacent to hull water surface 36.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weigth, the improvement comprising:

said catamaran-like sidehulls being, at least in part, individually boat shaped with substantially more narrow bows than aft sections where said boat shape is defined by an intersection of said catamaran-like sidehulls and a calm sea surface waterline when said supporting gas cushions are pressurized at sufficient pressure to support a majority of boat weight and the boat is underway at speeds of more than 25 knots, said catamaran-like sidehulls having recesses in their undersides for restraining at least a part of said pressurized supporting gas cushions and a lower water contacting surface of said catamaran-like sidehull both, at least in part, bounds a recess and diverges further from the catamaran-like sidehull's vertical centerline plane going aft from proximal said recess' forward portions.

2. The improved boat of claim 1 wherein said lower water contacting surface that at least partially bounds a recess of the catamaran-like sidehull, after diverging, becomes substantially more parallel to the vertical centerline plane of the sidehull over at least portions of an aft section of said catamaran-like sidehull.

3. The improved boat of claim 1 wherein said recesses in the catamaran-like sidehulls enlarge in width by at least twenty-five percent from their forward sections to their aft sections.

4. The improved boat of claim 1 wherein an average height of said recess above a lowest portion of a catamaran-like sidehull keel is less than fifty percent of a distance from the lowest portion of the catamaran-like sidehull keel to a wetdeck of said boat.

5. The improved boat of claim 1 wherein said catamaran-like sidehulls are asymmetrical when viewed in a calm sea surface waterline plane of said boat.

6. The improved boat of claim 1 which further comprises a center bow in mechanical communication with said connecting hull structure.

7. The improved boat of claim 6 wherein said center bow extends, at least in part, forwardly of said sidehulls.

8. The improved boat of claim 1 which further comprises at least one substantially rigid seal member disposed, at least partially, proximal one of said catamaran-like sidehull recesses and said substantially rigid seal member's underside, when viewed in at least one vertical transverse plane of the boat, contains surfaces that are angled to horizontal over a majority of said seal member's width.

9. The improved boat of claim 8 wherein said substantially rigid seal member, as seen in a vertical transverse plane of the boat, extends over a majority of catamaran-like sidehull recess width.

10. The improved boat of claim 8 wherein said substantially rigid seal member comprises, at least in part, lower sealing surfaces that are substantially more horizontal, as viewed in a vertical transverse plane of the boat, than said substantially rigid seal member's surfaces proximal to and forward of said lower sealing surfaces.

11. The improved boat of claim 8 wherein at least one of the substantially rigid seal members, as seen in a vertical transverse plane of the boat, has an inverted-V shape.

12. The improved boat of claim 1 which further comprises vertically oriented vented steps in a side surface of each of said catamaran-like sidehulls.

13. The improved boat of claim 12 wherein at least a part of said catamaran-like sidehull's side surface, as viewed in a horizontal plane of said boat, is closer to a vertical centerline plane of said catamaran-like sidehull over an aft portion than a more forward portion.

14. The improved boat of claim 1 which further comprises first forward movable seals disposed proximal a forward portion of said catamaran-like sidehull recesses where said first forward movable seals are movable in relation to the boat.

15. The improved boat of claim 14 wherein said first forward movable seals, when in lower positions, extend below catamaran-like sidehull keels.

16. The improved boat of claim 14 which further comprises a second forward movable seal that is movable in relation to the boat and that is longitudinally positioned, at least in part, aft of and proximal to the first forward movable seal.

17. The improved boat of claim 1 which further comprises an intermediate movable seal that is at least partially disposed proximal a catamaran-like sidehull recess with said intermediate movable seal movable in relation to the boat.

18. The improved boat of claim 1 which further comprises a first and a second recess in each of the catamaran-like sidehulls, said first and second recesses, at least in part, separated by recess seal members.

19. The improved boat of claim 18 wherein the gas pressurization means is capable of supplying gas at different pressures to the first and the second recesses.

20. In an improved boat having supporting gas cushions disposed in catamaran-like sidehulls with said catamaran-like sidehulls in mechanical communication with a connecting hull structure, said supporting gas cushions supplied with pressurized gas by gas pressurization means, and said supporting gas cushions pressurized at sufficient presure to support a majority of boat weight, the improvement comprising:

a recess in each catamaran-like sidehull with said recesses at least partially restraining the pressurized gas cushions, and lower water contacting surfaces of said catamaran-like sidehulls that both bound the recesses and diverge further, when the supporting gas cushions are pressurized at a sufficient pressure to support a majority of boat weight, from vertical centerline planes of said catamaran-like sidehulls going aft from proximal forward portions of said recesses and said lower water contacting surfaces of the catamaran-like sidehulls, after diverging, then become substantially more parallel to the vertical centerline planes of the sidehulls over at least portions of their aft sections.

21. The improved boat of claim 20 wherein said recesses in the catamaran-like sidehulls enlarge in width by at least twenty-five percent from their forward sections to their aft sections.

22. The improved boat of claim 20 wherein an average height of said recess above a lowest portion of a catamaran-like sidehull keel is less than fifty percent of a distance from the lowest portion of the catamaran-like sidehull keel to a wetdeck of said boat.

23. The improved boat of claim 20 wherein said catamaran-like sidehulls are asymmetrical when viewed in a calm sea surface waterline plane of said boat.

24. The improved boat of claim 20 which further comprises a center bow that is in mechanical communication with said connecting hull structure.

25. The improved boat of claim 20 which further comprises at least one substantially rigid seal member disposed, at least partially, proximal one of said catamaran-like sidehull recesses and said substantially rigid seal member's underside, when viewed in at least one vertical transverse plane of the boat, contains surfaces that are angled to horizontal over a majority of said seal member's width.

26. The improved boat of claim 25 wherein said substantially rigid seal member, as seen in a vertical transverse plane of the boat, extends over a majority of catamaran-like sidehull recess width.

27. The improved boat of claim 25 wherein said substantially rigid seal member comprises, at least in part, lower sealing surfaces that are substantially more horizontal, as viewed in a vertical transverse plane of the boat, than said substantially rigid seal member's surfaces proximal to and forward of said lower sealing surfaces.

28. The improved boat of claim 25 wherein at least one of the substantially rigid seal members, as seen in a vertical transverse plane of the boat, has an inverted-V shape.

29. The improved boat of claim 20 which further comprises vertically oriented vented steps in a side surface of at least one of said catamaran-like sidehulls.

30. The improved boat of claim 29 wherein at least a part of said side surface of said catamaran-like sidehull in way of said vertically oriented vented steps, as viewed in a horizontal plane of said boat, is narrower over an aft portion than a more forward portion.

31. The improved boat of claim 20 which further comprises a first forward movable seal disposed proximal a forward portion of one of said catamaran-like sidehull recesses where said first forward movable seal is movable in relation to the boat.

32. The improved boat of claim 31 wherein said first forward movable seal, when in lower positions, extends below a catamaran-like sidehull keel line of said catamaran-like sidehull.

33. The improved boat of claim 31 which further comprises a second forward movable seal that is movable in relation to the boat and that is longitudinally positioned, at least in part, aft of and proximal to the first forward movable seal.

34. The improved boat of claim 20 which further comprises an intermediate movable seal that is at least partially disposed proximal a catamaran-like sidehull recess with said intermediate movable seal movable in relation to the boat.

35. The improved boat of claim 20 wherein the connecting hull structure is in mechanical communication with an air flow turbulence generator.

36. The improved boat of claim 20 which further comprises a first and a second recess in each of the catamaran-like sidehulls, said first and second recesses, at least in part, separated by recess seal members.

37. The improved boat of claim 36 wherein the gas pressurization means is capable of supplying gas at different pressures to the first and the second recesses.

38. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:
a center bow that extends forwardly of upper forward portions of said catamaran-like sidehulls with said center bow in mechanical communication with the connecting hull structure, said connecting hull structure extending from proximal an upper forward portion of said catamaran-like sidehulls to proximal an upper forward portion of said center bow thereby forming a boat shape with a substantially pointed bow as defined by deck lines of said boat as seen in a top plan view of said boat and said catamaran-like sidehulls have recesses in their undersides for restraining at least part of said pressurized supporting gas cushions, and wherein at least one of said catamaran-like sidehull recesses enlarges going aft from its forward portions.

39. The improved boat of claim 38 which further comprises at least one substantially rigid seal member disposed proximal one of said catamaran-like sidehull recesses and said substantially rigid seal member's underside, when viewed in at least one vertical transverse plane of the boat, contains surfaces that are angled to horizontal over a majority of said seal member's width.

40. The improved boat of claim 39 wherein said substantially rigid seal member, as seen in a vertical transverse plane of the boat, extends over a majority of catamaran-like sidehull recess width.

41. The improved boat of claim 38 which further comprises vertically oriented vented steps in a side surface of at least one of said catamaran-like sidehulls.

42. The improved boat of claim 38 which further comprises a first forward movable seal disposed proximal a forward portion of one of said catamaran-like sidehull recesses where said first forward movable seal is movable in relation to the boat.

43. The improved boat of claim 38 which further comprises a first and a second recess in each of the catamaran-like sidehulls, said first and second recesses, at least in part, separated by recess seal members.

44. The improved boat of claim 43 wherein the gas pressurization means is capable of supplying gas at different pressures to the first and the second recesses.

45. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:
each of said catamaran-like sidehulls having, at least in part, a substantially single bow with said catamaran-like sidehulls, at least in part, being lower than the connecting hull structure, said connecting hull structure having a wetdeck on its underside with said wetdeck extending a majority of a distance between the catamaran-like sidehulls, and said catamaran-like sidehulls having recesses in their undersides for restraining at least part of said pressurized supporting gas cushions with a recess in one of said catamaran-like sidehulls, over at least a portion of its longitudinal length, enlarging in width going aft from its forward portions as seen in a horizontal water contacting plane of said boat when said boat is operating in a calm sea with the gas cushions pressurized to a sufficient pressure to support a majority of boat weight.

46. The improved boat of claim 45 wherein the recess in one of the catamaran-like sidehulls that is enlarging in width then becomes more constant in width over at least a portion of its longitudinal length.

47. The improved boat of claim 45 wherein said recesses in the catamaran-like sidehulls enlarge in width by at least twenty-five percent from their forward sections to their aft sections.

48. The improved boat of claim 45 wherein an average height of said recess above a lowest portion of a catamaran-like sidehull keel is less than fifty percent of a distance from the lowest portion of the catamaran-like sidehull keel to a wetdeck of said boat.

49. The improved boat of claim 45 wherein said catamaran-like sidehulls are asymmetrical when viewed in a calm sea surface waterline plane of said boat.

50. The improved boat of claim 45 which further comprises a center bow in mechanical communication with said connecting hull structure.

51. The improved boat of claim 50 wherein said center bow extends, at least in part, forwardly of said sidehulls.

52. The improved boat of claim 45 which further comprises at least one substantially rigid seal member disposed, at least partially, proximal one of said catamaran-like sidehull recesses and said substantially rigid seal member's undersides, when viewed in at least one vertical transverse plane of the boat, contains surfaces that are angled to horizontal over a majority of said seal member's width.

53. The improved boat of claim 52 wherein said substantially rigid seal member, as seen in a vertical transverse plane of the boat, extends over a majority of catamaran-like sidehull recess width.

54. The improved boat of claim 52 wherein said substantially rigid seal member comprises, at least in part, lower sealing surfaces that are substantially more horizontal, as viewed in a vertical transverse plane of the boat, than said substantially rigid seal member's surfaces proximal to and forward of said lower sealing surfaces.

55. The improved boat of claim 52 wherein at least one of the substantially rigid seal members, as seen in a vertical transverse plane of the boat, has an inverted-V shape.

56. The improved boat of claim 45 which further comprises vertically oriented vented steps in a side surface of at least one of said catamaran-like sidehulls.

57. The improved boat of claim 56 wherein at least a part of said side surface of said catamaran-like sidehull in way of said vertically oriented vented steps, as viewed in a horizontal plane of said boat, is narrower over an aft portion than a more forward portion.

58. The improved boat of claim 45 which further comprises a first forward movable seal disposed proximal a forward portion of one of said catamaran-like sidehull recesses where said first forward movable seal is movable in relation to the boat.

59. The improved boat of claim 58 wherein said first forward movable seal, when in lower positions, extends below a keel of said catamaran-like sidehull.

60. The improved boat of claim 58 which further comprises a second forward movable seal that is movable in relation to the boat and that is longitudinally positioned, as least in part, aft of and proximal to the first forward movable seal.

61. The improved boat of claim 45 which further comprises an intermediate movable seal that is at least partially disposed proximal a catamaran-like sidehull recess with said intermediate movable seal movable in relation to the boat.

62. The improved boat of claim 45 which further comprises a first and a second recess in each of the catamaran-like sidehulls, said first and second recesses, at least in part, separated by recess seal members.

63. The improved boat of claim 62 wherein the gas pressurization means is capable of supplying gas at different pressures to the first and the second recesses.

64. In an improved boat having supporting gas cushions disposed in catamaran-like sidehulls with said catamaran-like sidehulls in mechanical communication with a connecting hull structure, said supporting gas cushions supplied with pressurized gas by gas pressurization means, and said supporting gas cushions pressurized at sufficient pressure to support a majority of boat weight, the improvement comprising:

a first forward movable seal that is movable relative to the boat with said first forward movable seal disposed, at least partially, between substantially parallel internal surfaces of a catamaran-like sidehull and a recess in said catamaran-like sidehull that at least partially restrains the catamaran-like sidehull's pressurized supporting gas cushion and said recess enlarges aft of the catamaran-like sidehull's substantially parallel internal surfaces.

65. The improved boat of claim 64 wherein, after enlarging, said recess becomes substantially constant in width over at least portions of its aft sections.

66. The improved boat of claim 64 wherein said recesses in the catamaran-like sidehulls enlarge in width by at least twenty-five percent from their forward portions to their aft portions.

67. The improved boat of claim 64 wherein an average height of said recess above a lowest portion of a catamaran-like sidehull keel is less than fifty percent of a distance from the lowest portion of the catamaran-like sidehull keel to a wetdeck of said boat.

68. The improved boat of claim 64 wherein said catamaran-like sidehulls are asymmetrical when viewed in a calm sea surface waterline plane of said boat.

69. The improved boat of claim 64 which further comprises a center bow in mechanical communication with said connecting hull structure.

70. The improved boat of claim 64 which further comprises at least one substantially rigid seal member disposed, at least partially, proximal one of said catamaran-like sidehull recesses and said substantially rigid seal member's underside, when viewed in at least one vertical transverse plane of the boat, contains surfaces that are angled to horizontal over a majority of said substantially rigid seal member's width.

71. The improved boat of claim 64 which further comprises vertically oriented vented steps in a side surface of each of said catamaran-like sidehulls.

72. The improved boat of claim 71 wherein at least a part of said catamaran-like sidehull in way of said side surface, as viewed in a horizontal plane of said boat, is closer to a vertical centerline plane of said catamaran-like sidehull over an aft portion than a more forward portion of said catamaran-like sidehull.

73. The improved boat of claim 64 wherein said first forward movable seal, when in lower positions, extends below a catamaran-like sidehull keel of said catamaran-like sidehull.

74. The improved boat of claim 64 which further comprises a second forward movable seal that is movable in relation to the boat and that is longitudinally positioned, at least in part, aft of and proximal to the first forward movable seal.

75. The improved boat of claim 74 wherein said second forward movable seal extends, at least in part, transversely outward beyond said first forward movable seal.

76. The improved boat of claim 64 which further comprises an intermediate movable seal that is at least partially disposed proximal a catamaran-like sidehull recess with said intermediate movable seal movable in relation to the boat.

77. The improved boat of claim 64 which further comprises a first and a second recess in each of the catamaran-like sidehulls, said first and second recesses, at least in part, separated by recess seal members.

78. The improved boat of claim 77 wherein the gas pressurization means is capable of supplying gas at different pressures to the first and the second recesses.

79. The improved boat of claim 64 which further comprises a movable seal that is positioned proximal an aft end of the catamaran-like sidehull's recess.

80. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:
said catamaran-like sidehulls having recesses in their undersides for restraining at least part of said pressurized supporting gas cushions, substantially rigid seal members disposed, at least partially, proximal said catamaran-like sidehull recesses and said substantially rigid seal members' undersides, when viewed in at least one vertical transverse plane of the boat, contain surfaces that are angled to horizontal over a majority of said seal members' width, and wherein at least one of said catamaran-like sidehull recesses enlarges going aft from its forward portions.

81. The improved boat of claim 80 wherein at least one of said catamaran-like sidehull recesses enlarges by one or more step-like enlargements.

82. The improved boat of claim 80 wherein said catamaran-like sidehull recess, after enlarging, then becomes more constant in width over at least part of its aft portions.

83. The improved boat of claim 80 wherein said substantially rigid seal member, as seen in a vertical transverse plane of the boat, extends over a majority of catamaran-like sidehull recess width.

84. The improved boat of claim 80 wherein said substantially rigid seal member comprises, at least in part, lower sealing surfaces that are substantially more horizontal, as viewed in a vertical transverse plane of the boat, than said substantially rigid seal member's surfaces proximal to and forward of said lower sealing surfaces.

85. The improved boat of claim 80 which further comprises a step inset into lower sealing surfaces of the substantially rigid seal member thereby reducing a wetted area of said substantially rigid seal member.

86. The improved boat of claim 85 which further comprises means to supply pressurized gas to said step inset into the lower sealing surfaces of the rigid seal member.

87. The improved boat of claim 80 wherein at least one of the substantially rigid seal members, as seen in a vertical transverse plane of the boat, has an inverted-V shape.

88. The improved boat of claim 80 which further comprise vertically oriented vented steps in a side surface of at least one of said catamaran-like sidehulls.

89. The improved boat of claim 80 which further comprises a center bow in mechanical communication with said connecting hull structure.

90. The improved boat of claim 80 which further comprises a first and a second recess in each of the catamaran-like sidehulls, said first and second recesses, at least in part, separated by recess seal members.

91. The improved boat of claim 90 wherein the gas pressurization means is capable of supplying gas at different pressures to the first and the second recesses.

92. The improved boat of claim 80 wherein the substantially rigid seal member's underside, when viewed in at least one vertical transverse plane of the boat, contains surfaces that are biased to one side of a vertical centerline plane of the catamaran-like sidehull.

93. The improved boat of claim 80 which further comprises a movable seal with said movable seal positioned proximal an aft end of the catamaran-like sidehull's recess.

94. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:
a first and a second recess capable of restraining at least portions of the catamaran-like sidehull's supporting gas cushions in each of the catamaran-like sidehulls, said first and second recesses in each of the catamaran-like sidehulls can be supplied with gases at different pressures by the gas pressurization means to thereby aid in controlling boat motions and one of said recesses in each catamaran-like sidehull enlarges going aft from forward portions of said recesses.

95. The improved boat of claim 94 wherein the gas pressurization means comprises a separate gas pressure supply source for the first and for the second recess.

96. The improved boat of claim 94 wherein the gas pressurization means further comprises a controller that directs a supply of gas to the first and the second recess with said controller receiving as inputs boat orientation readings.

97. The improved boat of claim 94 wherein the gas pressurization means further comprises a controller that directs a supply of gas to the first and the second recess with said controller receiving as inputs values of pressures in the first and the second recess.

98. The improved boat of claim 94 wherein the gas pressurization means further comprises an interconnecting duct and valve that connects a recess in one sidehull with a recess in another sidehull.

99. In an improved boat having supporting gas cushions disposed in catamaran-like sidehulls with said catamaran-like sidehulls in mechanical communication with connecting hull structure, said supporting gas cushions supplied with pressurized gas by gas pressurization means, and said supporting gas cushions pressurized at sufficient pressure to support a majority of boat weight, the improvement comprising:
said catamaran-like sidehulls having recesses in their undersides for restraining at least part of said pressurized supporting gas cushions and wherein at least one of said catamaran-like sidehull recesses enlarges going aft from its forward portions, and vertically oriented vented steps in side surfaces of the catamaran-like sidehulls, said side surfaces of the catamaran-like sidehulls, as viewed in a horizontal plane of said boat, are at least in part closer to a vertical centerline plane of said sidehulls over aft portions than more forward portions of said catamaran-like sidehulls.

100. The improved boat of claim 99 wherein said vertically oriented vented steps are, at least in part, more forward at their upper portions than their lower portions.

101. The improved boat of claim 99 wherein a chine of the catamaran-like sidehull is disposed, at least partially, further from a vertical centerline plane of said catamaran-like sidehull than the vertically oriented vented steps of said catamaran-like sidehull.

* * * * *